No. 633,823. Patented Sept. 26, 1899.
J. C. FLEMING.
VENTILATOR AND AIR PURIFIER.
(Application filed Sept. 26, 1898.)
(No Model.)
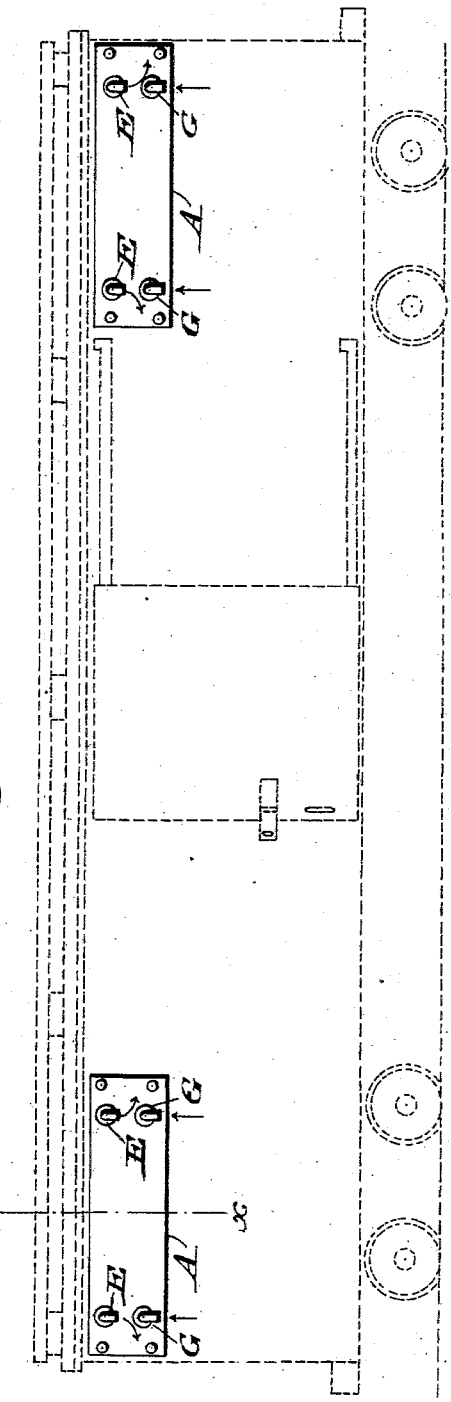
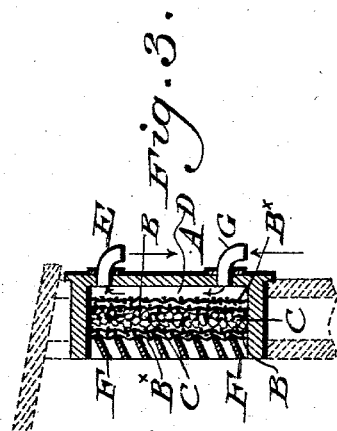
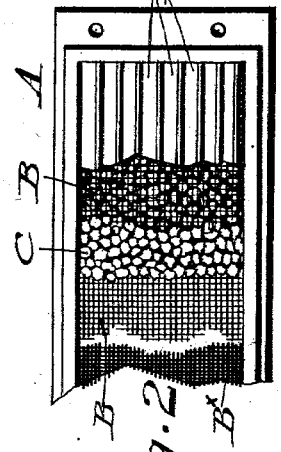

UNITED STATES PATENT OFFICE.

JOHN C. FLEMING, OF PHILADELPHIA, PENNSYLVANIA, ASSIGNOR OF ONE-THIRD TO ANGUS J. MACDONALD, OF NEW YORK, N. Y.

VENTILATOR AND AIR-PURIFIER.

SPECIFICATION forming part of Letters Patent No. 633,823, dated September 26, 1899.

Application filed September 26, 1898. Serial No. 691,846. (No model.)

*To all whom it may concern:*

Be it known that I, JOHN C. FLEMING, a citizen of the United States, residing in the city and county of Philadelphia, State of Pennsylvania, have invented a new and useful Improvement in Ventilators and Air-Purifiers, which improvement is fully set forth in the following specification and accompanying drawings.

The object of my invention is to keep the air in refrigerators perfectly free from any noxious gases which may arise from the chemical changes which are continually taking place where animal products are stored in airtight apartments, especially in places where said products are in a naked or unprotected condition from the closed air around them, and in order to accomplish this I take advantage of the law that the use of charcoal held in space by wire screening, thereby exposing its surface and the inclosing casing, will effectively and completely condense and neutralize any gases generated other than the pure air, on which said charcoal has no effect, it being also known that while the charcoal condenses and neutralizes any effete matter which may be given off it is not in the least affected therefrom. To make this charcoal more effective and permanent in its usefulness, the exterior wall thereof should be continually in contact with non-polluted or common air from the outside. In this way the charcoal will keep good for years, during which period the car, house, or apartment in which the same is located is kept healthy and sweet and also the products stored therein, and, furthermore, the charcoal will have no tendency to raise the temperature of the storage-space. This system of refrigeration will keep therein meats from getting sour or musty and will also keep fruits and vegetables from mildew or rot.

My invention is also practical for brewers' use where changes are continually taking place during the fermentation of beer, certain chemical changes also taking place where the beer is stored in open vats, and by the use of my invention the beer will be surrounded at all times by perfectly pure air, thereby securing a practically perfect product, it being further apparent that the employment of my invention in this connection will also prevent the use of sulfur or other means which are now utilized for the purpose of neutralizing bad odors.

To the above ends the object sought to be obtained by the present invention is accomplished in the first place by the action of the charcoal in keeping the storage dry, and in the next place the action of the charcoal is so instantaneous in neutralizing noxious gases that it does not allow the accumulation of effete matter or odors which otherwise would intensify and hasten the decomposition or chemical changes in the material stored within its reach, since it will be easily seen that the material stored within a given space and the air within that space being kept in a healthy and natural condition will have a positive effect in keeping the goods therein in a healthy condition, and the desired temperature will remain unchanged. The decomposition must be checked by the action of the charcoal, as in all cases where air and water are confined and deprived of their natural liberty they become destructive elements, and there is no other means of storing air and keeping it in a healthy condition other than the means embodied in my invention as described.

My invention also consists in providing an inlet and outlet for pure air adjacent the exterior surface of the charcoal, whereby the latter is kept in a healthy condition.

It further consists of novel details of construction, all as will be hereinafter fully set forth, and particularly pointed out in the claims.

Figure 1 represents a side elevation of a ventilator and air-purifier embodying my invention. Fig. 2 represents a side elevation of the interior thereof on an enlarged scale. Fig. 3 represents a vertical section on line *x x*, Fig. 1, on an enlarged scale.

Similar letters of reference indicate corresponding parts in the figures.

Referring to the drawings, A designates a box or casing which is adapted to be secured to the side or other proper portion of an apartment or car and has within the same the diaphragms B, formed of gauze, netting, latticework, or foraminous plates and containing between them charcoal or other purifying substance C, said diaphragms being set back from the front wall of said casing A, so as to form the air-receiving chamber D, which is in communication with the atmosphere by means of the nozzles or pipes E and G.

In the casing back of the diaphragms are the deflectors F, which are of the form of slats or bars placed at an inclination and separated from each other, so as to leave air-passages between them.

The air passes upwardly through the nozzles G and so fills the chamber D, after which it continues upwardly and outwardly through the nozzles E, it being noted that by this construction a body of pure air adjacent the exterior surface of the charcoal is always provided, whereby the air within the compartment, car, or other device to which the purifier is attached is relieved of the noxious gases therein by means of the charcoal in proximity thereto, while said charcoal is kept in a perfect condition by reason of the proximity of the pure air, the manner of supplying the same and the inlets and outlets therefor being understood from Fig. 3. The special function of the deflectors or slats F is to serve as a protection to the inner or left-hand screen B, (seen in Fig. 3,) and, if desired, said slats can be omitted, as can also the outer wall of the box or casing A. It will be evident that my invention is applicable to both stationary and moving objects, and the box or casing A can be secured in position in any desired or convenient manner.

When the device is attached to a car, as shown in the present instance, it will be evident that the inlet-nozzles G may be adjusted, if desired, so as to cause an ingress of the air by reason of the motion or progression of the car, while the egress of the air from the chamber D may be facilitated by turning the outlet-nozzles E in such a direction that the motion of the car assists or tends to form a vacuum in the chamber D.

In practice I employ a plurality of wire screens on each side of the charcoal, the screen nearest said charcoal being of fine wire or mesh, as indicated at B, while the exterior wire screens B<sup>×</sup> are of coarser wire or mesh in order to support and give strength to said fine wire.

If desired, I can employ a plurality of devices, as above described—viz., a body of charcoal contained between a fine and coarse wire screen, the same being superimposed upon each other and held from displacement in any suitable manner.

It will be apparent that other slight changes may be made by those skilled in the art, which may come within the scope of my invention, and I therefore do not desire to be limited in every instance to the exact construction I have herein shown and described.

Having thus described my invention, what I claim as new, and desire to secure by Letters Patent, is—

1. In a ventilator or air-purifier, a body of charcoal, screens between which said charcoal is supported, an air-chamber adjacent the exterior surface of said charcoal, the inner surface of the latter being adapted to be exposed to noxious gases, and outlets and inlets for the upper and lower portions of said air-chamber.

2. In a ventilator or air-purifier, a body of charcoal, upright screens between which said charcoal is supported, an upright air-chamber adjacent the exterior surface of said charcoal, the inner surface of the latter being adapted to be exposed to noxious gases, and outlets and inlets for the upper and lower portions of said air-chamber.

3. In a ventilator or air-purifier, a body of charcoal, upright screens on each side thereof, the screens adjacent said charcoal being of fine mesh and the outer screens being of coarser mesh, an air-chamber adjacent the exterior surface of said charcoal, and inlet and outlet pipes for said air-chamber.

4. In a ventilator or air-purifier, a body of charcoal, upright screens on each side thereof, the screens adjacent said charcoal being of fine mesh and the outer screens being of coarser mesh, an air-chamber adjacent the exterior surface of said charcoal, inlet and outlet pipes for said chamber, and deflectors located near the inner surface of said charcoal.

5. A casing having a pipe connected therewith, an air-receiving chamber in communication with said inlet, an outlet for said chamber, deflectors on the inner side of said casing, and foraminous diaphragms with purifying material between them, said diaphragms being interposed between the air-receiving chamber and said deflectors.

6. A ventilator and an air-purifier consisting of a casing having an air-pipe connected therewith, an air-receiving chamber within the casing in communication with said pipe, an outlet for said chamber, foraminous diaphragms rearward of said chamber with charcoal between them, and deflectors on the inner side of said charcoal whereby atmospheric air is directed by said pipe into said air-chamber, then passes therethrough and out said outlet, whereby a body of air is always located in proximity to the outer side of said purifying material, the inner side thereof being adapted to absorb and neutralize the noxious gases adjacent thereto.

7. A ventilator and an air-purifier consisting of a casing, having an air-inlet connected therewith, an air-receiving chamber within said casing in communication with said inlet, an outlet for said chamber, a body of charcoal in said casing, a screen of fine wire on either side of said charcoal and screens of coarser wire adjacent said fine-wire screens.

JOHN C. FLEMING.

Witnesses:
JOHN A. WIEDERSHEIM,
E. HAYWARD FAIRBANKS.